United States Patent [19]

Melin et al.

[11] Patent Number: 4,869,824
[45] Date of Patent: Sep. 26, 1989

[54] BUBBLE PLATE SYSTEM FOR BIOLOGICAL PURIFICATION OF AIR AND WASTE WATER

[75] Inventors: Thomas Melin; Hubert Stracke, both of Cologne; Otto Barth, Bergisch-Gladbach, both of Fed. Rep. of Germany

[73] Assignee: Bayer Aktiengesellschaft, Leverkusen, Fed. Rep. of Germany

[21] Appl. No.: 283,008

[22] Filed: Dec. 8, 1988

Related U.S. Application Data

[63] Continuation of Ser. No. 56,566, Jun. 1, 1987, abandoned.

[30] Foreign Application Priority Data

Jun. 20, 1986 [DE] Fed. Rep. of Germany ....... 3620728

[51] Int. Cl.$^4$ ........................................... B01D 17/038
[52] U.S. Cl. ................................. 210/615; 210/620; 210/151; 210/220; 210/221.2; 55/90; 55/220
[58] Field of Search ............. 210/150, 151, 615, 620, 210/220, 221.2; 261/114.2, 114.3, 122, 113; 55/90, 220

[56] References Cited

U.S. PATENT DOCUMENTS

| | | | |
|---|---|---|---|
| 2,600,710 | 6/1952 | Wade | 261/114.2 |
| 3,070,359 | 12/1962 | Canevari | 261/113 |
| 4,100,063 | 7/1978 | Hartmann | 210/615 |
| 4,279,842 | 7/1981 | Belveal | 210/220 |
| 4,303,528 | 12/1981 | Shibayama | 210/615 |
| 4,305,895 | 12/1981 | Heath et al. | 261/114.2 |
| 4,318,870 | 3/1982 | Haselden | 261/114.3 |
| 4,486,361 | 12/1984 | Durot et al. | 210/221.2 |
| 4,604,197 | 8/1986 | Louboutin et al. | 210/150 |
| 4,662,900 | 5/1987 | Ottengraf | 210/615 |

FOREIGN PATENT DOCUMENTS

0129198 12/1984 European Pat. Off. ......... 261/114.2

Primary Examiner—Richard V. Fisher
Assistant Examiner—Cynthia L. Nessler
Attorney, Agent, or Firm—Sprung Horn Kramer & Woods

[57] ABSTRACT

The outgoing gas or waste water is conveyed through a gas-liquid contact apparatus in which biological purification takes place. A bubble plate-type column (2) is used as gas-liquid contact apparatus. The biomass is distributed over the plates (3) in the form of an aqueous suspension with a layer height corresponding to a liquid content per plate greater than 0.07 m$^3$/m$^2$, preferably greater than 0.15 m$^3$/m$^2$ of column cross-section. During the biological purification of gas, the gas to be purified is supplied at the lower end of the bubble plate-type column (2). It then flows through the plates (3) and issues again as purified gas at the top of the plate column (2). When the plate column is used for purifying waste water, the waste water to be purified is conveyed from top to bottom through the plate column (2) and is traversed by air, oxygen or oxygen-containing gas. At the same time, a proportion of the biomass is separated from the purified waste water and re-circulated into the entering waste water or into the column. The waste water to be purified flows successively over the plates (3) to the liquid outlet (11). From here, the clarified waste water flows out through the overflow (13). This process is suitable, in particular, for highly charged waste water, particularly if a compact structure is required during construction of the apparatus.

10 Claims, 3 Drawing Sheets

BUBBLE PLATE SYSTEM FOR BIOLOGICAL PURIFICATION OF AIR AND WASTE WATER

This application is a continuation of application Ser. No. 056,566, filed 6/1/87 now abandoned.

BACKGROUND OF THE INVENTION

The invention relates to a process for the biological purification of outgoing gas or waste water, in which the outgoing gas or waste water is conveyed through a gas-liquid contact apparatus. The invention also relates to an apparatus for carrying out the process.

The following requirements are imposed on biowashers and biofilters for the biological purification of outgoing air:

1. High efficiency, i.e. the most complete removal of pollutants and odorous substances from the outgoing air;
2. Small dimensions, in particular small cross-sectional area (space requirement);
3. Low energy consumption (operating costs);
4. Simple construction and operation;
5. Effectiveness for the widest range of pollutants in the greatest ranges of concentrations.

It is particularly difficult to satisfy these requirements if high requirements are imposed on the material exchange capacity owing to the high pollutant content of the outgoing air and the high oxygen requirement usually associated with it for biological decomposition or owing to the low water-solubility of the components to be removed.

During a detailed investigation of known biowashers and biofilters, it is found that all of them have considerable defects in at least one but usually in several of the above mentioned criteria.

Virtually all biofilters can be operated only at low gas speeds (—0.1m/s or lower) and therefore necessitate large areas. They tend to clog up if there is high pollutant content and an associated high growth of the biomass. If strong acids (HCl, HF, $H_2SO_4$ or $HNO_3$) are formed during biological decomposition as, for example, during the decomposition of halogenated hydrocarbons or various sulphur or nitrogen compounds, then the pH in the biofilters (for example compost filters) falls and the biological decomposition capacity comes to a standstill if the pH is not adjusted by addition of a base, and this increases the pressure loss and is accompanied by problems of poor distribution (liquid collects at edge with countercurrent) or losses in efficiency (liquid entrains pollutant).

The known biowashers, for example jet washers, packed columns or conventional plate columns (see, for example, Japanese patent application No. 51-67048) with subsequent bioreactors have the main disadvantage of the extremely high liquid stream from the washer to the bioreactor and back usually required for transporting dissolved harmful substances and dissolved oxygen. Although this disadvantage can be reduced by addition of sorbents (for example activated carbon) these measures are accompanied by new disadvantages (abrasion, maintenance and investment costs for coal storage and disposal).

The jet washer has the further disadvantage of the increasing complexity of the plant if low solubility of the pollutants and/or low permissible final concentration necessitate a multiple stage process.

SUMMARY OF THE INVENTION

The object was to develop a process with the associated apparatus for the biological purification of outgoing air and waste water which meets the requirements set out on page 1 with a minimum of compromises.

This object is achieved according to the invention in that a plate column is used as gas-liquid contact apparatus and the biomass required for biological decomposition is suspended in the liquid and in that a liquid holdup per plate greater than 0.07 $m^3$, preferably greater than 0.15 $m^3$ is adjusted per $m^2$ of column cross-section during operation by means of known outlet weirs or outlet tubes. The term plate column refers here to a column with at least two plates on which a liquid which is at least partially gassed, i.e. traversed by the gas stream to be purified, is located, wherein the gas issues through openings (slits, holes, valves) in the plates or in fittings connected to the plates (bell, stacks; ducts etc) and thus traverses the plates and at least a proportion of the liquid located thereon in succession in a counter-current or cross/counter-current to the gas. In contrast to the plates conventional in distillation and absorption with a relatively small liquid content (holdup) of 0.05 $m^3$ per $m^2$ of plate area at the maximum, a large holdup is desired in the process according to the invention in order to achieve the required reaction volume without an excessive number of plates. On the other hand, as a specific number of plates is required for the absorption of the pollutants or of the oxygen required for aerobic decomposition, depending on the desired final purity of the gas and solubility and starting concentration of the pollutants, a specific optimum liquid holdup per plate lying between about 0.07 and 2 $m^3/m^2$ of plate area is produced according to the application.

The gassing through all the liquid, which is usual with conventional plates, leads to a high pressure loss in the gas stream and to high energy consumption with the desired liquid levels. This problem is advantageously solved by gassing only a proportion of the liquid in that the gas is guided through stacks or ducts, which are connected to the plate and can have a wide variety of forms, through the lower (ungassed) liquid layer and only then issues through slits or holes in said stacks or ducts or in fittings (for example so-called bells) or moving fittings (for example so-called valves) fixed thereon or on the plates or the wall into the liquid. The disadvantages normally associated with this partial gassing, the poor exchange of material between ungassed and gassed liquid and the sedimentation of biomass in the ungassed region are avoided according to a development of the invention in that convection streams are produced by substantially vertical fittings (baffle plates or guide tubes) which distribute the liquid chamber into gassed upward movement zones and ungassed downward movement zones. For this purpose, the baffle plates and guide tubes are dimensioned and arranged in such a way that an intermediate space which is sufficient for circulation is located between the plate and upper edge of the baffle plates or guide tubes and between the upper edge thereof and the liquid surface. The level of the liquid (gas-liquid bubble layer) is determined by the upper edge of the outlet tubes or outlet ducts and the rise of liquid above the outlet weir (similar to the conditions with conventional plates).

With the preferably used design with gas ascent ducts, the internal surfaces of the ducts facing the gas chamber can be purged of adhering biomass in a particularly simple manner if tubes with suitably arranged spray nozzles and spray holes are arranged perpendicularly to the ducts under the plates at anytime. These tubes are preferably rotatable round their longitudinal axis. The purging effect can thus be improved The decisive difference between the process according to the invention and conventional biowashers resides in the fact that the majority of the volume required for biological decomposition can be arranged in the plate column (integrated absorber/bioreactor). If necessary, however, additional after-reactors (for example pump models) can be inserted into the external liquid cycles.

It has been found that a gas stream of 300 m$^3$/h, charged with various organic pollutants, whose concentration varied between 100 mgC/m$^3$ and 4000 mgC/m$^3$ could be substantially purified while maintaining biomass concentrations of up to 15 g of dry substance/L in the suspension, using a 450 mm DN biowasher column according to the invention with a total liquid content of 0.9 m$^3$ distributed over 10 plates with a pressure loss of about 0.1 bar. Blockages in the liquid region did not occur. Occasional blockages in the interior of the gas ducts could be detected by the increase in the pressure drop and could easily be removed using the purging apparatus described above. The operating cost were far below those of other outgoing gas treatment processes.

Thus, for example, the energy costs (mainly for gas conveyance) were far less than 1/10 of the energy cost (mainly for liquid conveyance) of an equally effective multi-stage biological jet washer apparatus, if difficult water-soluble substances (for example toluene) have to be washed out.

It has also been found that streams of waste water can also be biologically purified in an advantageous manner using the bioreactor according to the invention. For this purpose, the waste water to be purified is conveyed through the plate column and is traversed by air, oxygen or oxygen-containing gas. A proportion of the biomass is at the same time separated from the purified waste water and re-circulated into the entering waste water or into the column. This process is particularly suitable for highly charged waste water, particularly if an extremely compact structure is important.

Very high air inlet rates can be achieved with relatively low energy consumption owing to the high possible air throughput per area (over 1m/s of empty tube rate) in comparison to conventional apparatus. A very compact apparatus is produced with the high biomass concentrations then attainable. The residence time spectrum can be influenced on the basis of external circuit layout and, if desired, a multi-staged biological clarifying plant can be produced in a single apparatus. Owing to the large liquid throughputs in comparison with outgoing gas treatment, the measures which are conventional in this case with distillation plate columns should be taken (large ducts, possibly multi-flooding plates). The separation of activated sludge can be effected in thickeners as in a conventional purification plant. However, to avoid losing a main advantage of the plant according to the invention, its small space requirement, preference is given to separating devices which are more compact, for example flotation cells.

Embodiments of the invention are described in more detail with reference to drawings.

DETAILED DESCRIPTION OF THE INVENTION

Figure 1:
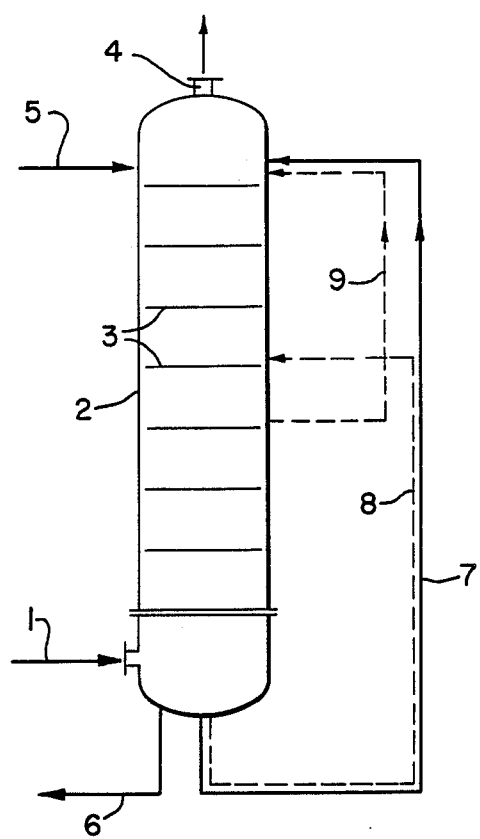
FIG. 1 shows a flow diagram of the bioreactor according to the invention for biological purification of outgoing gas.

According to FIG. 1, the untreated gas is supplied through the feedpipe 1 at the lower end of the plate column 2. It then flows through the plates 3 and issues again as purified gas at the top of the plate column 2 through the nozzle 4. Nutrient solution is introduced through the feedpipe 5 at the top of the column or at other points. Excess sludge and consumed nutrient solution can flow out of the sump through the pipe 6 or from one of the plates 3. Sedimentation and re-circulation of the sludge can be provided for (not shown). A proportion of the suspension is normally re-circulated to the top of the column (circuit 7) or to one of the plates (circuit 8). A return 9 can also' be provided inside the plates. The circuits 8 and 9 shown in broken lines form a two-stage return in this case. Devices for adjusting the pH can be fitted into the circuits in order to keep the pH constant. The circuits can also serve for homogenizing the biomass concentration and for supplying the microorganisms with inorganic nutrient salts which can be introduced, for example, into the circuits in dissolved or solid form. The concentration of organic substances dissolved in the suspension (nutrition for the micaroorganisms) and of the oxygen can also be homogenized within limits by external circuits.

Figure 2:
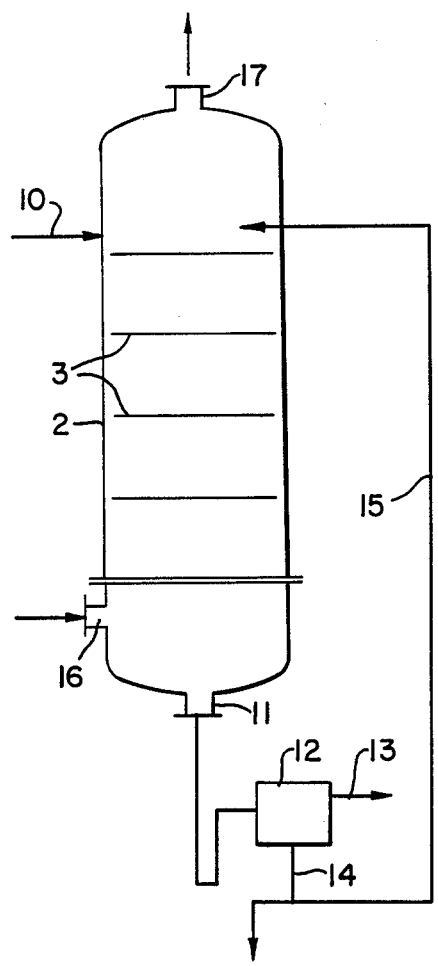
FIG. 2 shows a flow diagram of the bioreactor for the purification of waste water.

According to FIG. 2, the plate column 2 is used for the purification of waste water. The untreated waste water is supplied via the inlet 10 to the uppermost plate 3 and flows from there in succession over the plates 3 to the liquid outlet 11 and from there into the sludge retaining device 12. From here, the clarified waste water flows through the overflow 13 while the excess sludge is removed through the pipe 14 and return sludge is re-circulated via the circuit 15 onto the uppermost plate 3. The air required for aerobic waste water treatment is supplied through the nozzle 16 on the plate of the column 2, traverses the plates 3 in a counter-current to the liquid and issues again through the outlet nozzle 17 at the top of the column.

In contrast to FIG. 2, the untreated waste water can also be supplied on a plate lower than the uppermost plate. The plates above the untreated water supply then serve for biological outgoing gas purification for volatile waste water constituents which are otherwise discharged with the air stream serving to supply oxygen.

The biological purification of the outgoing gas produced during the treatment of waste water can also be carried out in a separate column however, and this is often expedient owing to the greatly differing liquid charge of the two parts of the apparatus. Division of the outgoing gas and/or waste water treatment into several columns which are operated in parallel or in series with respect to the gas stream and/or the liquid stream is also useful in other cases. For example, structural a reasons (height) or the use of existing apparatus (batches of columns, condensers etc) can also play a part, like the greater flexibility then available during variations in load (connection during an increase in the waste water or outgoing gas production or in the concentration of pollutants to be decomposed).

Figure 3:
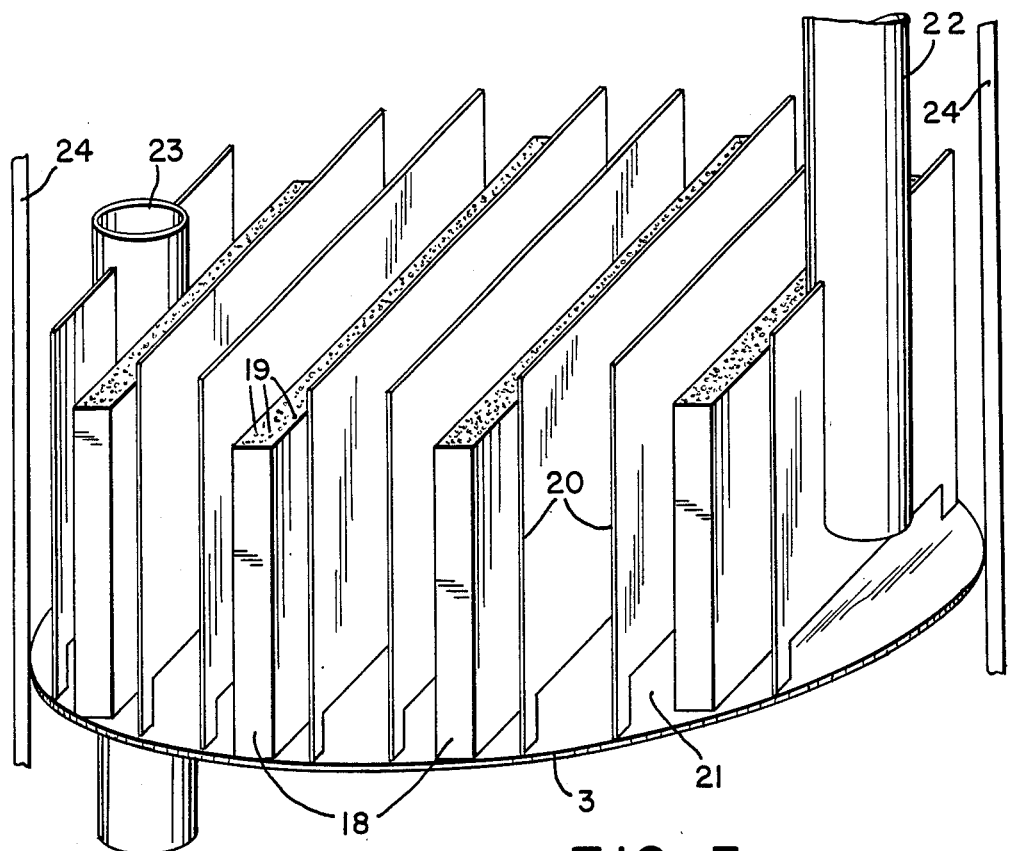
FIG. 3 shows a plate of the bioreactor with fittings for introducing the outgoing gas into the liquid.

The structure of the column plate 3 is shown in more detail in FIG. 3. The gas to be purified (feedpipe 1 in FIG. 1) flows upwards through the ducts 18 of rectangular cross-section (fittings) and enters through the gas outlet openings designed as holes 19 in this case into the liquid. Vertical baffle plates 20 are arranged between the ducts 18. The baffle plates 20 produce convection streams in the liquid, wherein the liquid flows upwards in the zones between the gas ducts 18 and the baffle plates 20, liberates the gas issuing from the gas ducts 18 at the top, flows in part laterally over the upper edges of the baffle plates 20, flows down again in the zones between the baffle plates and enters the zones between baffle plate 20 and gas duct 18 again through the gaps 21 directly on the plate 3. This mammoth pump stream flowing round the baffle plates 20 causes mixing on the plates 3 and dispersion of the solids in the liquid (activated sludge). In addition, a superimposed cross-flow of liquid from the inlet pipes 22 or ducts to the outlet pipes 23 also takes place on the plates. The seal between the plates 3 and the column wall 24 as well as the fixing of the plates 3 in the column are known from distillation technology and need not therefore be described in more detail here.

Figure 4:
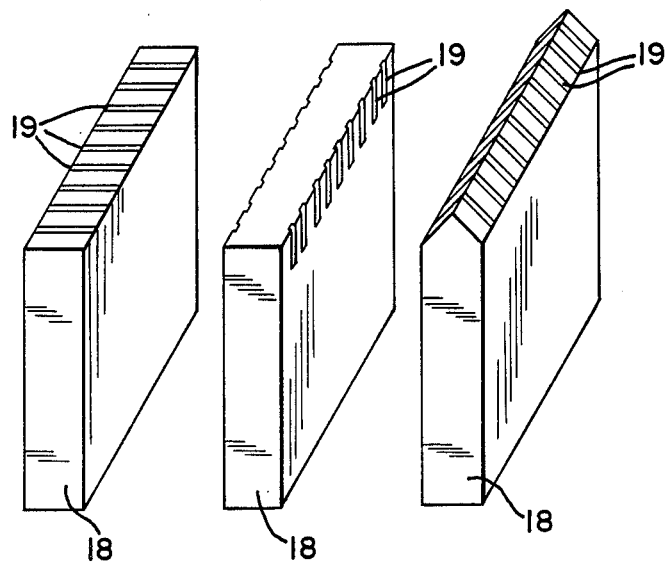
FIG. 4 shows various embodiments of the fittings with gas outlet openings.

FIG. 4 shows various embodiments of the gas outlet openings at the upper end of the cuboid ducts 18. The gas outlet openings 19 are designed as horizontally (left-hand side of diagram) and vertically (centre of diagram) running slits or as slit-shaped openings in a duct which is sealed in the manner of a roof (right-hand side of diagram).

Figure 5:
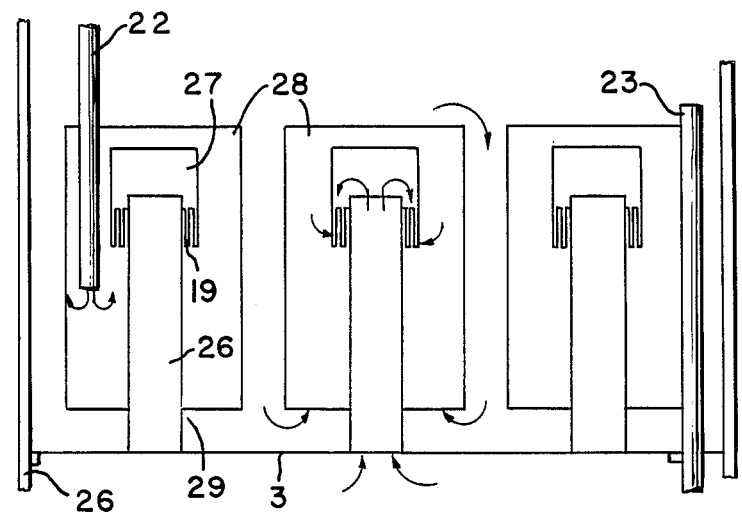
FIG. 5 shows a schematic section through a plate with cylindrical gas stacks.
Figure 6:
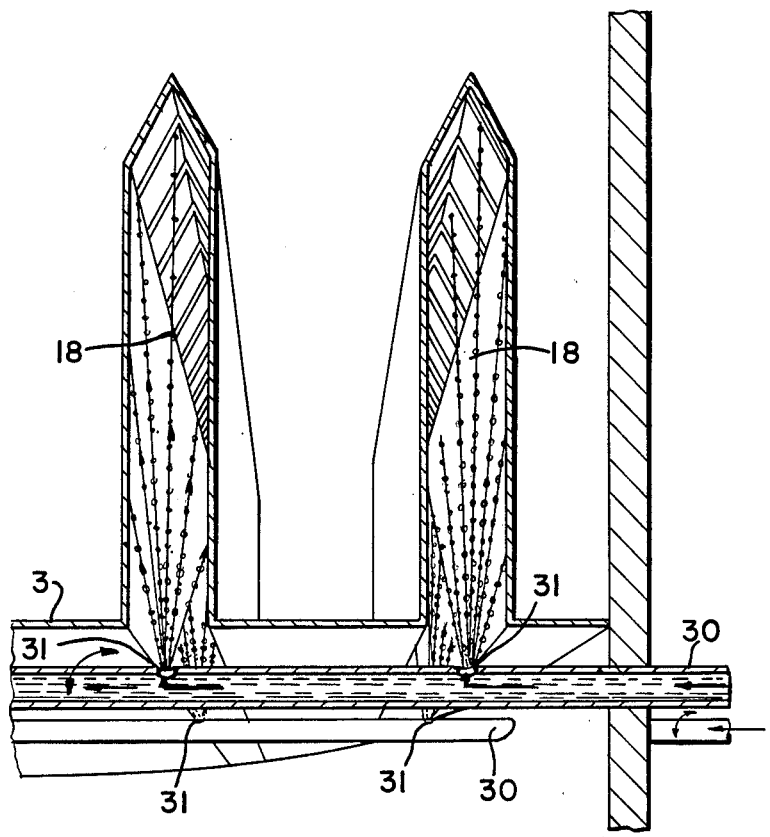
FIG. 6 shows a schematic illustration (perspective section) through a plate with spray tubes.

FIG. 5 shows a cross-section through a plate design with cylindrical gas ducts 26 on which there are fixed bells 27 having slits 19 as gas outlet openings. Round the bells 27 there are arranged concentric guide tubes 28 which leave a gap 29 between the actual plate 3 and its lower edge, through which the liquid can flow from the liquid zones between the guide tubes 28 and the stacks 26 or the bells 27. The liquid then flows upwards, is gassed at the slits 19 and flows over the upper edges of the guide tubes 28 into the zones between the guide tubes and down again there (see flow arrows). As in the design according to FIG. 3, the liquid flows through the pipe 22 to the plate and out again into the pipe 23 at the upper edge. During continuous operation, wall fouling by microorganisms can occur in the gas outlet ducts 18 or stacks 26 and bells 27, and this can lead to blockage of these parts, which serve for the supply of gas, in extreme cases. In the preferably selected design with ducts, this wall fouling can be rinsed off particularly simply by free spraying, by introducing rinsing tubes 30 with spray openings 31 or spray nozzles perpendicularly to the ducts 18 into the gas chamber below the corresponding plates 3, according to FIG. 6, and spraying or rinsing the gas outlet ducts clear as required. The number of tubes required can be particularly small if they are arranged rotatably about their longitudinal axis so that a relatively large duct length can be covered per spray opening or nozzle by rotation. The spray openings 31 each lie under the gas ascent ducts 18 so that all internal sides of the gas ducts can be sprayed or rinsed clear by rotating the rinsing tubes running perpendicularly to the longitudinal direction of the gas ducts. With relatively large columns, a correspondingly greater number of tubes are arranged in parallel at intervals based on the spraying width of the nozzles or spray openings 31 which, in turn, depends on the geometry (duct height; tube and spray opening diameter) and the initial pressure of the rinsing liquid.

It is obvious that the embodiments described with reference to FIGS. 1 to 6 can be varied in many ways without departing from the scope of the invention.

We claim:

1. In a process for the biological purification of at least one of effluent gas and waste water, wherein the effluent is contacted with an aqueous biomass suspension, the improvement comprising:
    (a) conveying the effluent to be treated through a plate column having at least two plates having openings therein,
    (b) distributing the biomass suspension over the plates of the column,
    (c) passing gas through the openings into the biomass suspension to form a bubble layer on each plate, and
    (d) maintaining a liquid holdup of the biomass suspension on each plate which is greater than 0.07 m$^3$ per m$^2$ of column cross-section.

2. A process according to claim 1, further comprising traversing waste water conveyed through the plate column by one of air, oxygen and oxygen-containing gas and separating a proportion of the biomass from the purified waste water and recirculating the separated biomass into on of the entering waste water and the column.

3. A process according to claim 1, further comprising adjusting the concentrations of at least one of adsorbed pollutants, decomposition products, nutrients the biomass and pH by re-circulating liquid in the column.

4. A process according to claim 1, further comprising introducing the waste water below an uppermost plate.

5. A process according to claim 1, further comprising at least one additional, plate column connected in one of parallel and series with said plate column, with respect to the effluent to be treated.

6. The process according to claim 1, wherein a liquid hold up of greater than 0.15 m$^3$ per m$^2$ is maintained.

7. A bioreactor for the biological purification of effluent gas and waste water comprising: a plate column having at least two plates having openings therein and an aqueous biomass suspension thereon, means for conveying effluent for treatment through the plate column, means for passing gas through the openings into the biomass suspension to form a bubble layer on each plate and means for maintaining a liquid holdup of the biomass suspension on each plate of greater than 0.07 m$^3$ per m$^2$ of column cross-section.

8. A bioreactor according to claim 7, further comprising one of baffle plates and guide tubes on the plates for producing convection streams in the liquid.

9. A bioreactor according to claim 7, wherein the plates have rinsing tubes with spray openings or spray directed toward internal surfaces of the plates.

10. A bioreactor according to claim 9, wherein the rinsing tubes are rotatable about a longitudinal axis thereof.

* * * * *

UNITED STATES PATENT AND TRADEMARK OFFICE
CERTIFICATE OF CORRECTION

PATENT NO. : 4,869,824

DATED : September 26, 1989

INVENTOR(S) : Melin et al.

It is certified that error appears in the above-identified patent and that said Letters Patent is hereby corrected as shown below:

Col. 6, line 35   Delete " on " and substitute -- one --

Col. 6, line 39   After " nutrients " delete " the " and substitute -- , --

Col. 6, line 63   Delete " or spray "

Signed and Sealed this

Eighth Day of September, 1992

Attest:

DOUGLAS B. COMER

*Attesting Officer*   *Acting Commissioner of Patents and Trademarks*